(No Model.) 6 Sheets—Sheet 3.
C. M. CLINTON & J. McNAMARA.
TYPE WRITING MACHINE.
No. 448,934. Patented Mar. 24, 1891.
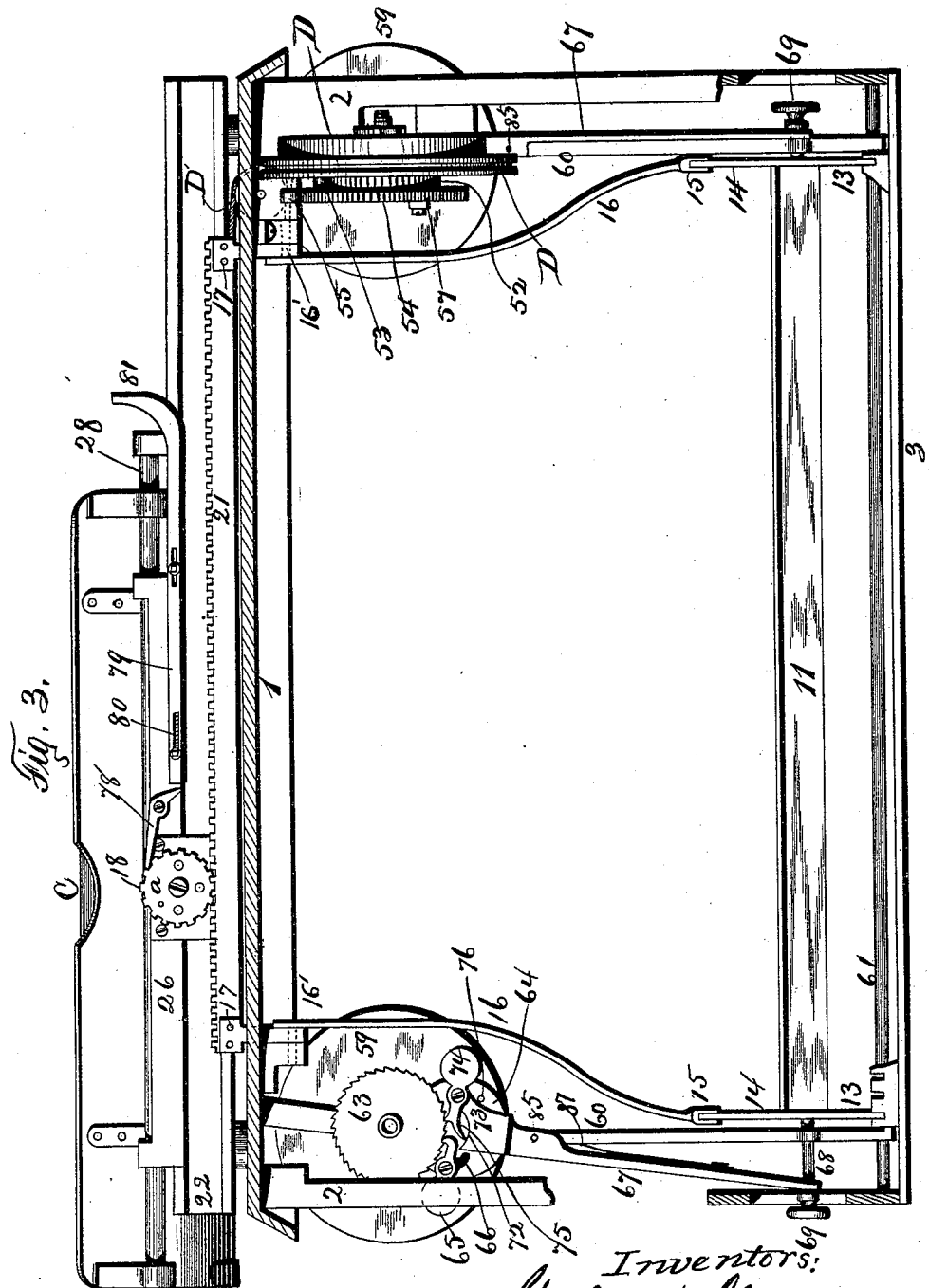

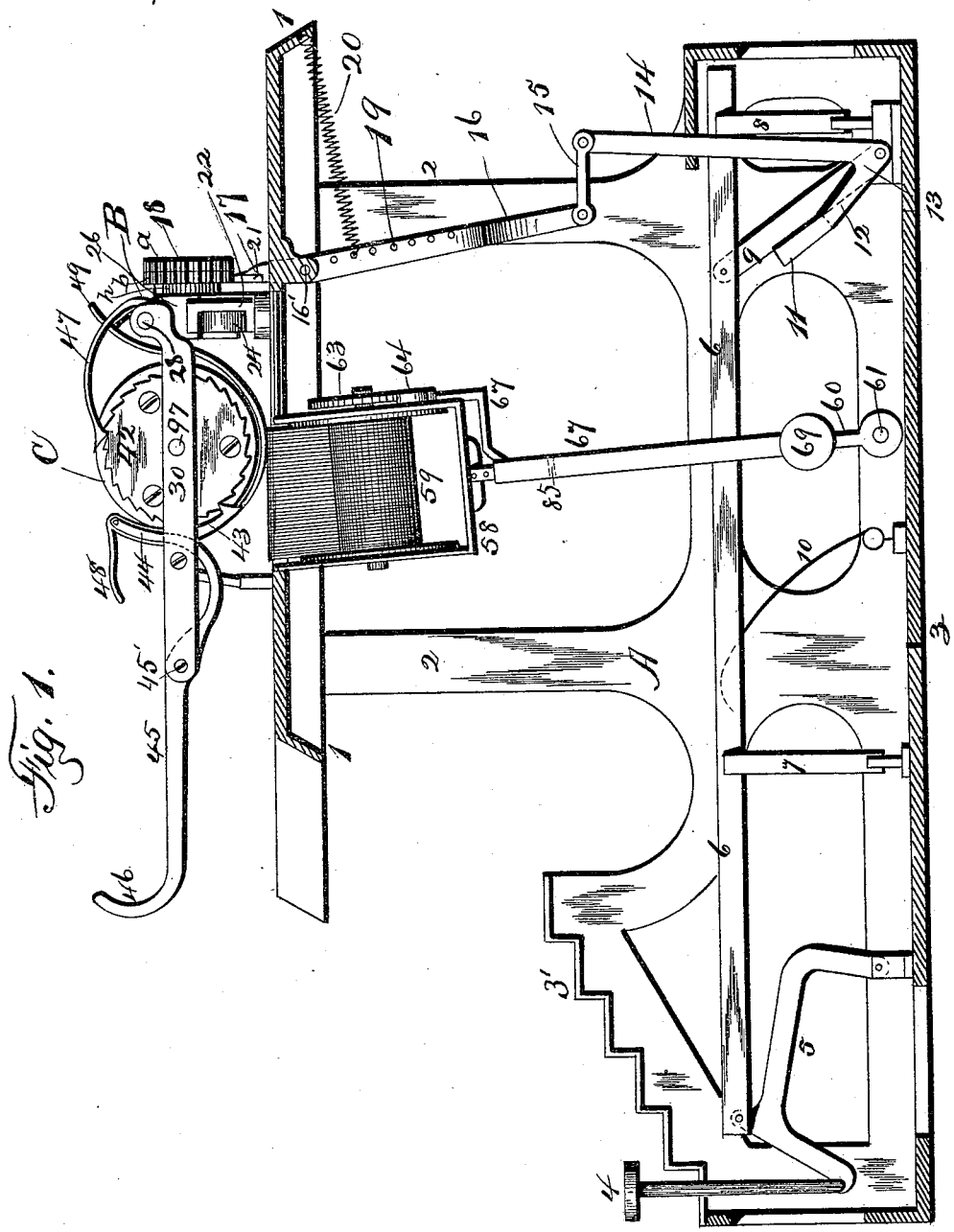

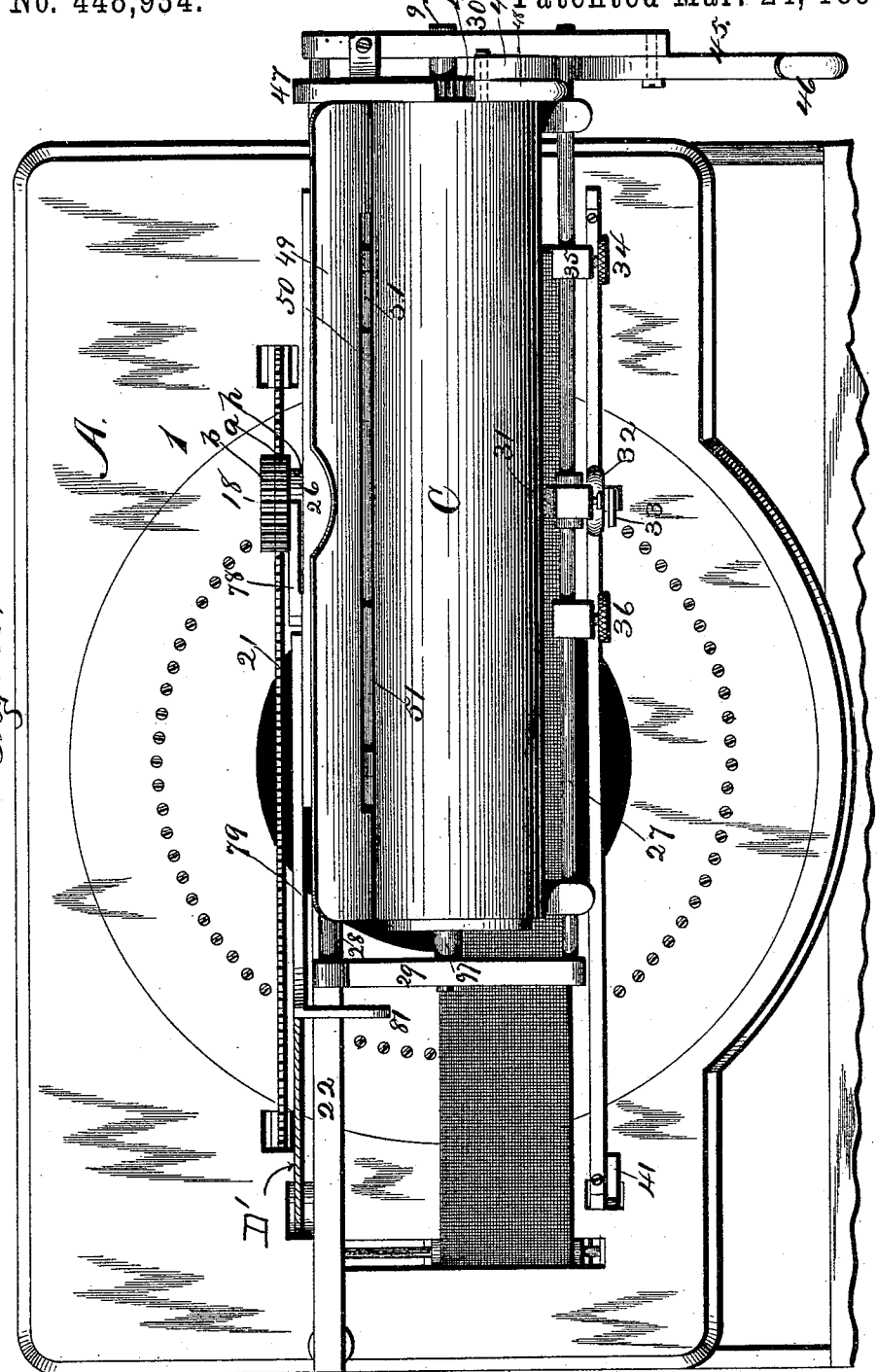

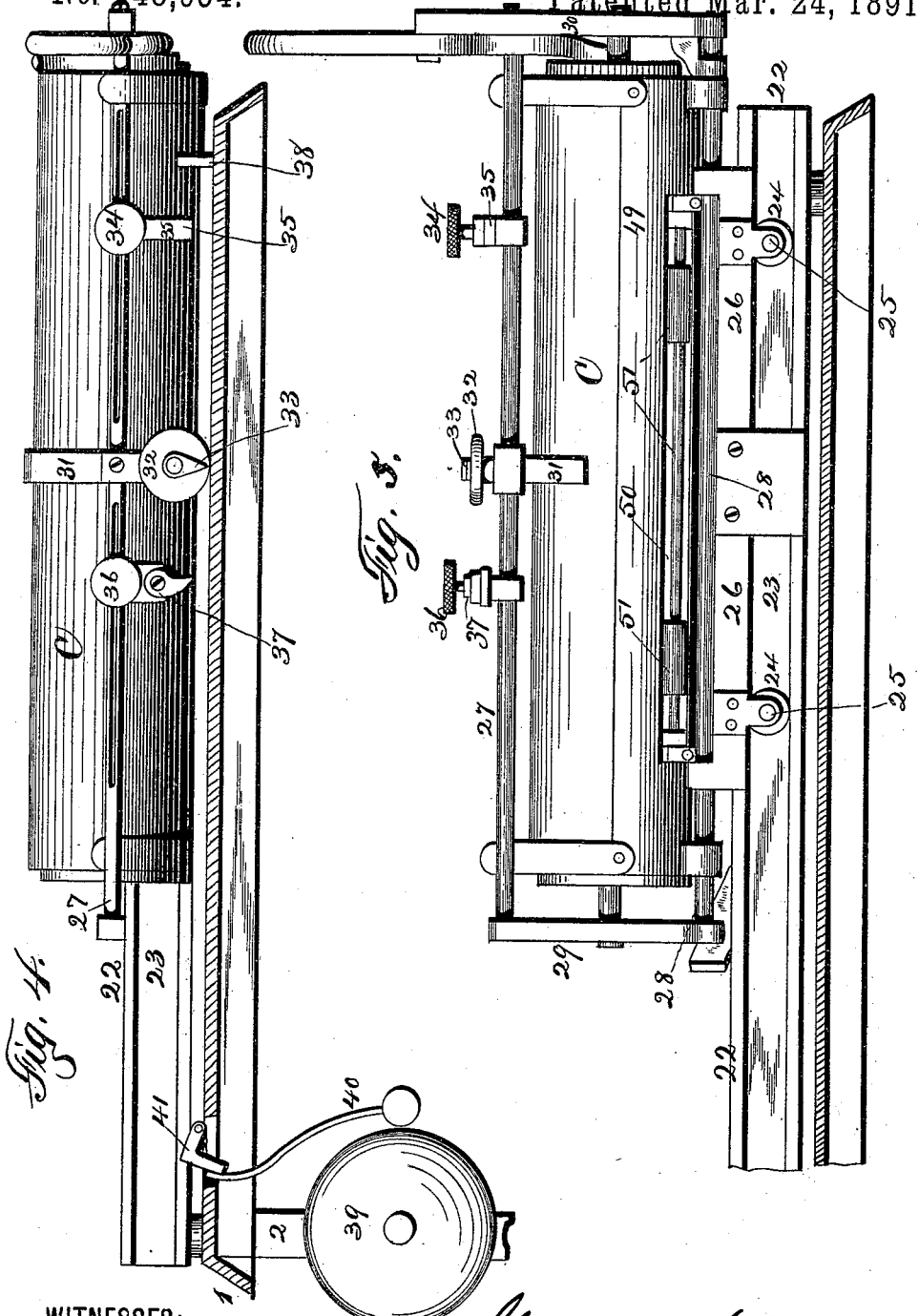

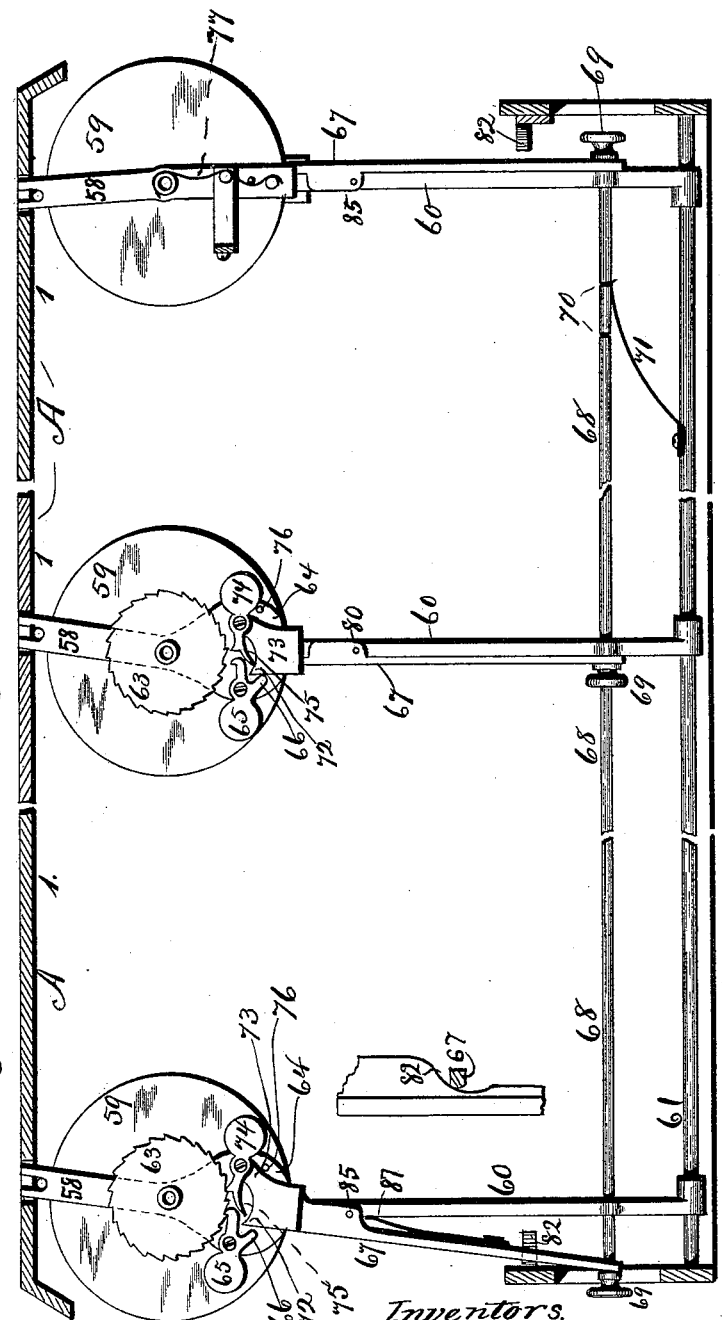

(No Model.) 6 Sheets—Sheet 6.
C. M. CLINTON & J. McNAMARA.
TYPE WRITING MACHINE.
No. 448,934. Patented Mar. 24, 1891.
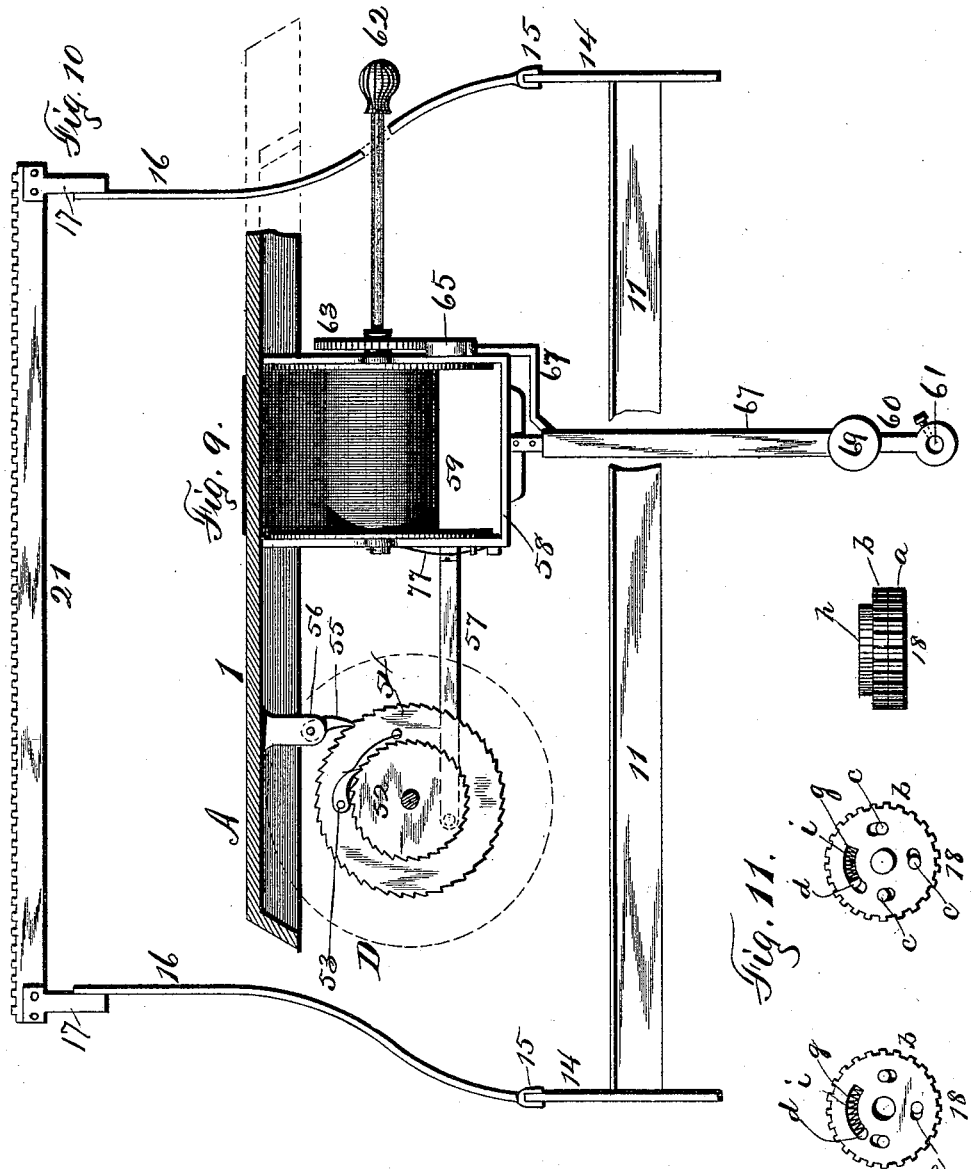
Witnesses:
Alex. Scott
Jno. W. Graham
Inventors:
Charles M. Clinton &
James McNamara
by Smith & Denison
Attorneys

UNITED STATES PATENT OFFICE.

CHARLES M. CLINTON AND JAMES McNAMARA, OF ITHACA, NEW YORK, ASSIGNORS OF TWO-THIRDS TO CHARLES M. TITUS, OF SAME PLACE.

TYPE-WRITING MACHINE.

SPECIFICATION forming part of Letters Patent No. 448,934, dated March 24, 1891.

Application filed April 25, 1890. Serial No. 349,573. (No model.)

*To all whom it may concern:*

Be it known that we, CHARLES M. CLINTON and JAMES McNAMARA, of Ithaca, in the county of Tompkins, in the State of New York, have invented new and useful Improvements in Type-Writers, of which the following, taken in connection with the accompanying drawings, is a full, clear, and exact description.

This invention relates to type-writing machines, and its object is to improve upon those parts thereof commonly known as the "carriage," the "carriage-feed," the "feed-escapement," the "ribbon-feed," and the "alarm" mechanism.

To that end our invention consists in the construction and combination of parts forming a portion of a type-writing machine, hereinafter described and claimed, reference being had to the accompanying drawings, in which—

Figure 1 is a vertical section of the frame of our type-writing machine, showing a right-hand end view of the carriage and a side elevation of some other part. Fig. 2 is a top view of a portion of the same machine. Fig. 3 is a vertical section of the same, viewed from the rear. Fig. 4 is vertical section showing also the front of the carriage and alarm-bell. Fig. 5 is a similar section showing the carriage tilted upward for inspection of the writing. Figs. 6, 7, and 8 are longitudinal vertical sections of a portion of the frame, showing end views of the ribbon-spools, Fig. 6 showing also a detail in plan. Fig. 9 is a transverse vertical section of part of the frame-table, showing a ribbon-spool and its connections. Fig. 10 is a side view of the feed-rack and its supports, and Fig. 11 shows five views of the feed gear-wheels.

A represents the main frame of the machine, comprising the table 1, side posts 2, base 3, and key-board 3'.

4 is a key passing freely down through the key-board and pivotally supported on the arm of an elbow-lever 5, which is pivoted to the base 3.

6 is the draw-bar pivotally supported upon the elbow-lever 5 and a brace 9, which is also pivoted to the base, whereby the draw-bar is given a parallel motion forward and downward between guide-posts 7 and 8, covered in another application of ours, dated March 14, 1890, Serial No. 343,836.

10 is a spring acting to raise the draw-bar and key.

11 is a bar crossing the machine beneath the supporting-braces 9 of all the key draw-bars 6 and attached to arms 12 of two elbow-levers 13, whose other arms 14 are connected by links 15 with levers 16, upon whose upper arms 17 the feed-rack 21 is fixed. The levers 16 are pivoted to the main frame at 16'.

18 represents the escapement, whose principal members are two similarly-toothed wheels $a$ $b$, journaled upon the carriage-beam 26 and adapted to be engaged by the feed-rack 21, a ratchet-wheel $h$, fixed to the gear-wheel $b$, and a retaining-pawl 78, pivoted to the said beam.

19 represents a series of holes in the lever 16, and 20 a spring hung at one end to the table 1 and adapted at its other end to be hooked to the lever 16 at any one of the holes 19 to hold the rack in its normal position in engagement with the wheel $b$ and to hold the bar 11 pressed against the braces 9. The various holes 19 not only permit adjustment of the strain of the spring 20 to each machine when new, but to increase the strain of the spring if it should become weak by long service.

The gear-wheel $a$ is provided with a series of fixed studs $c$, adapted to register with a series of elongated holes or slots $e$ in the gear-wheel $b$, and it is further provided with a stud $d$, adapted to register with a slot $g$ in the wheel $b$, while a spring $i$, located in said slot, acts against the stud $d$ to rotate the wheel $a$ backward relatively to the wheel $b$. When the operator strikes either a letter or spacing key, the brace 9 is drawn forward, carrying with it the cross-bar 11 of the elbow-lever 13, which actuates the lever 16 to swing the rack 21 out of engagement with the wheel $b$ into engagement with wheel $a$, and the wheel $a$, being free to turn so far as the studs $c$, may move in the length of the holes $e$, and the carriage is pulled along a corresponding amount, which is one letter-space. Then when the said letter or spacing key is released the spring 10 restores the draw-bar 6 and brace 9 to their normal position of rest, permitting the cross-bar 11 and its connections to be returned by spring 20, thus restoring the rack to engagement with the wheel *b*. This liberates wheel *a*, and it is returned by spring *i*, and this round of movements is repeated at every stroke of the key. The carriage may be freely moved backward to the left in Fig. 3, at any time, the pawl 78 dragging on the ratchet-wheel *h*, while the gear-wheel *b* rolls in the teeth of the feed-rack 21; but the said pawl resists forward movement of the carriage.

79 is the relief-latch, fitted with slots to engage screws upon the carriage-beam 26, whereby it may slide in line of the lower arm of the pawl 78, and 80 is a spring acting upon the latch to draw it away from the pawl, as shown in Fig. 3.

81 is a finger-leaf on the latch 79. If the latch be pushed firmly against the pawl 78 the latter will be disengaged from the ratchet-wheel *h*, and the carriage will be set free to be slid either way.

Each letter-space is measured by the amount which the studs *c*, moving in the holes *e*, permits the wheel *a* to revolve, and that must nearly correspond with the tooth-spaces of the wheels in order that they may nearly coincide to permit the rack to vibrate from one wheel to the other.

22 is a rail secured to the table 1 and grooved in its front side to receive rollers 24, journaled upon studs 25, fixed in attachments of the carriage-beam 26.

27 is the front rod, 28 the rear rod, 29 the left-hand end beam, and 30 the right-hand end beam, of the carriage, and the said rear rod is journaled in bearings of the beam 26, in which bearings the carriage may be rocked over backward to permit writing to be examined on the under side of the impression-cylinder C, which cylinder is mounted on a shaft 97, journaled in the end beams 29 and 30.

31 is the paper-guide secured to the front rod 27, and it carries a roller 32, which travels upon the table 1 to support the front side of the carriage.

33 is a pointer fixed upon the stud on which the roller 32 is mounted. The front rod 27 is slotted to receive a screw 34, by which the margin-regulator 35 is adjustably secured in place, and 38 is a lug fixed upon the table in the path of the said regulator 35, whereby the beginning point of the lines may be fixed. The carriage can only be drawn back until the regulator 35 meets the lug 38.

39 is a bell fixed to one of the supports 2.

40 is a bell-hammer pivotally hung upon the table by an elbow-lever 41, having an inclined top, the bell-hammer being at the opposite side of the pivot, so that its weight holds the lever 41 normally raised into the path of a trip-latch 37, which is pivoted upon a block adjustably secured to the rod 27 by means of a set-screw 36. The latch 37 stands rigidly and bears the elbow-lever 41 down out of its path when moving to the left, Fig. 4, and permits the said lever to escape and drop the hammer against the bell when the latch passes off from the elbow-lever. When the carriage is again returned to the right, the latch 37 swings to the left and drags freely over the lever 41.

42 is a ratchet-wheel secured to the end of the cylinder C.

43 is a hook hung upon one arm 44 of the lever 45, which is pivoted at 45′ to the end beam 30. This lever is provided with a handle 46, which being pressed down will operate the hook 43 to rotate the cylinder, and which being raised tilts the carriage back for inspecting the writing.

47 is a detent engaging the ratchet-teeth of wheel 42 with a wedge-shaped point, which holds the cylinder from revolving under the usual strains of service, yet permits the cylinder to be revolved either way if a little force be applied.

48 is a finger-lever on the hook 43, by raising which the cylinder will be set free from the hook to be revolved either way in aligning the paper.

49 is an apron carried by the rear frame-rod 28, to guide the paper around the cylinder, and it is slotted at 50 to permit the paper roller 51 journaled to the apron to come in contact with the paper on the cylinder. This roller 51 is enlarged near its ends to obtain a more reliable bearing on the paper near its edges than it would do if it were of the same size all the way across.

D is the spring-wheel journaled to one of the posts 2 transversely to the line of the carriage, and D′ represents a suitable cord or chain to be wound on said wheel and passing over a pulley in the table to be connected with the carriage, whereby the spring-wheel draws constantly to feed the carriage.

52 and 54, Figs. 3 and 9, are two ratchet-wheels joined as one and mounted to revolve freely upon the spring-wheel shaft and connected with that wheel by a pawl 53, pivoted upon wheel D.

55 is a detent pivotally hung upon a bracket 56, which depends from the table 1, to engage wheel 54.

57 is a pitman connecting the yoke 58, in which the ribbon-spool 59 is journaled, with a crank-pin on wheel 54. There are two ribbon-spools 59, one at each end of the machine, and their respective yokes 58 are provided with arms 60, secured both to one rock-shaft 61, which is journaled in the main frame.

When the carriage-feed wheel D moves forward at each letter-space, it carries with it the wheels 52 and 54 by means of pawl 53, and the yoke 58 is gradually oscillated transversely one step at a time by the connecting pitman 57, thus bringing a fresh spot of the ribbon for each succeeding type to strike. These spots are in line across the ribbon, and when the feed-wheel is rotated by returning the carriage, the detent 55 prevents the integral wheels 54 and 52 from turning, so that the ribbon is held stationary while the carriage is returned.

67 is the ribbon-feed lever pivoted at 85 upon the arm 60, and provided with a spring 87, which presses it outward, as in Fig. 6, against a curved wedge 82, which is fixed to the frame.

63 is a ratchet-wheel fixed upon the shaft of the ribbon-spool 59.

74 is a pawl pivoted upon an arm 73 of lever 67, and weighted to return it to engagement with wheel 63.

65 is a gravity-detent, pivoted upon the spool-yoke 58 to engage the ratchet 63, and provided with an arm 66 in the path of an arm 72 of lever 67.

76 is a pin or stud projecting from yoke 58 to limit the receding motion of lever 67.

75 is an arm of pawl 74, adapted to be engaged by detent 65.

As the ribbon-supporting arms 60 are moved by means of pitman 57 a step laterally at each step of the carriage forward, the lever 67 is gradually pressed by the lateral wedge 82 toward arm 60, thereby carrying pawl 74 and rotating ratchet 63 and feeding along the ribbon-spool 59, the detent 65 holding ratchet 63 during the return-motion of lever 67. During this service the arm 72 does not reach the arm 66, but a shifter-rod 68 engages the levers 67 by means of knobs 69, and whenever it is desirable to change the direction of the ribbon-feed the projecting knob 69 may be pressed in, whereby the working-lever 67 will be thrown out of engagement with its wedge 82, as shown in Fig. 8, the arm 72 will meet arm 66 and draw detent 65 downward upon arm 75, thus disengaging both pawl and detent from ratchet 63, as shown in Fig. 7, and the rod 68 has two annular grooves 70 to be engaged by a spring detent 71, whereby the rod and levers will be held as set. The same act also releases both pawl 74 and detent 65 on the opposite lever 67 to set them in operation. Thus at each step of the feed the ribbon moves crosswise about the height of a letter, and at each cross movement it advances about the width of a letter, thus distributing the action of the type evenly over the whole ribbon.

77 is a tension-spring bearing on the spool-shaft to prevent it being moved by any jar or shake of the machine to overrun or loosen the ribbon. The ribbon-feed is by intermitted steps both transversely and longitudinally while writing is being done, but stops while the carriage is being returned. The feed-rack is always geared into one of the wheels $a$ or $b$, so that they cannot be misplaced, and by pressing the leaf 81 in the direction to draw out the feed-cord D' the detent is disengaged from the ratchet $h$, whereby the wheel $b$ is set free to roll either way on the rack. Then one finger at 81 may carry the carriage freely either way, leaving the operator's other hand free for service. The beam 26 fits over the top of rail 22, while the rollers 24 within the groove of the rail hold the beam thereon, as shown in Figs. 1 and 5, whereby the beam is kept in line with little friction. The lever 45 is rigidly fixed to the carriage against upward movement, so that the carriage may be readily lifted thereby, without rotating the cylinder, the latter being done by downward pressure on the lever.

62 is a removable key, whereby the ribbon-spool may be turned to tighten the ribbon. There are two wheels 52 and 54 of different sizes to permit the pawl 53 to revolve without interference with the stationary detent 55, but it is evident that a pawl and ratchet-wheel engagement between the crank-wheel 54 and the spring-wheel D would be as well secured if the small wheel 52 were integral with the wheel D and the pawl 53 pivoted to wheel 54.

A complete lateral movement of the spool-carriers 58 is accomplished by each revolution of the crank-wheel 52, and the location of the wedge 82 is such that the lever 67 travels to and fro up and down the wedge, accomplishing one stop in the forward rotation of the spool at each lateral movement thereof, but this is entirely independent of the position of the carriage, because the relation of the chain-wheel D is being continually changed relative to the crank-wheel 52.

Having thus fully described our invention, what we believe to be new, and desire to secure by Letters Patent, is the following:

1. The combination, in type-writing machines, of a series of draw-bars 6, mounted at one end on pivoted braces 9 and connected each with a type-key, a feed-rack 21, mounted on levers 16, pivoted to swing the rack transversely, a cross-bar 11, fixed to elbow-levers 13 and located beneath the braces 9, and connections between the levers 13 and 16, substantially as described.

2. The combination of the draw-bars 6, the braces 9, supporting one end thereof, the elbow-levers 13, provided with the cross-bar 11, the feed-rack 21, mounted on levers 16, the latter being connected with the elbow-levers 13 and provided with a series of holes 19, and a spring 20, adapted to engage the lever 16 at any one of said holes.

3. The combination of a feed-rack, gear-wheels mounted on the carriage to engage the said rack continually and a ratchet upon one of the said wheels, a detent pivoted upon the carriage to engage the said ratchet, and a latch fitted to slide upon the carriage and to disengage the detent from the ratchet while moving in the direction to resist the feed-cord.

4. The combination of a spring feed-wheel journaled to the frame transversely to the line of the carriage, ribbon-spools mounted to oscillate in the said transverse direction, and a crank-and-pitman connection between the spring feed-wheel and spool-supports, substantially as described.

5. The combination of the feed-wheel D, the ratchet-wheels 52 and 54, mounted freely on the journal thereof, a pawl 53 on the wheel D to engage the wheel 52, a detent 55, hung to a fixture of the frame to engage wheel 54, a ribbon-spool 59, journaled in a pivoted yoke 58, and a pitman 57, connecting the said yoke with the wheel 54.

6. The combination of a carriage-feed wheel, a ratchet-wheel freely mounted on the shaft thereof and provided with a crank, a pawl-and-ratchet connection between the said crank-wheel and the feed-wheel, a detent to engage the crank-wheel, yokes for ribbon-spools hung for lateral movement, and a pitman connecting one of said yokes with the aforesaid crank.

7. The combination of two spool-yokes provided with arms fixed at the opposite ends of a rock-shaft, a ratchet-wheel for each spool journaled in the said yokes, a feed-lever pivoted upon the arm of each yoke, a weighted pawl upon the said lever and a detent upon the yoke adapted to engage the said ratchet-wheel, a wedge fixed transversely upon the frame to engage one arm of the said lever, a spring pressing the feed-lever to engage the wedge, and means for reciprocating the yokes transversely.

8. The combination of a yoke having an arm mounted on a rock-shaft, a ribbon-spool journaled in said yoke and provided with a ratchet-wheel, a feed-lever pivoted upon the said arm and having two upward arms, on one of which a pawl is pivoted to engage the said ratchet-wheel, a detent pivoted upon the yoke and having a downward arm to be engaged by the other of the said two lever-arms, the said pawl having a forwardly-projecting arm to be engaged by the said detent, and means for operating the feed-lever, substantially as described.

9. The combination of two spool-yokes having arms mounted on a rock-shaft, feed-levers pivoted upon the said arms, wedges fixed transversely to the frame to engage the respective feed-levers, springs for the feed-levers, a shifter-rod fitted to slide through the two mounted arms and through the said feed-levers and provided with knobs to engage the latter, and, further, having two annular grooves, and a spring fixed to alternately engage the same, whereby either one of the feed-levers may be set to work and the other restrained.

10. The combination of a spool-yoke mounted for transversely-reciprocating movement, a feed-lever pivoted upon an attachment of the yoke, a wedge fixed transversely upon the frame, and a spring to press the feed-lever against the wedge.

11. The combination of two spool-yokes mounted for transverse reciprocating movement, two feed-levers, and a shifter-rod upon the same mountings, the rod being adapted to put one feed-lever into service and the other out by the same movement, substantially as described.

In witness whereof we have hereunto set our hands this 19th day of April, 1890.

CHARLES M. CLINTON.
   JAMES McNAMARA.

In presence of—
 T. J. McELHENY,
 M. E. PEARSON.